G. P. KINGSBURY.
TYPOGRAPHICAL MACHINE.
APPLICATION FILED SEPT. 18, 1915.

1,197,033.

Patented Sept. 5, 1916.
7 SHEETS—SHEET 5.

Witnesses:

Inventor
George P. Kingsbury
By his Attorneys
Rogers, Kennedy & Campbell

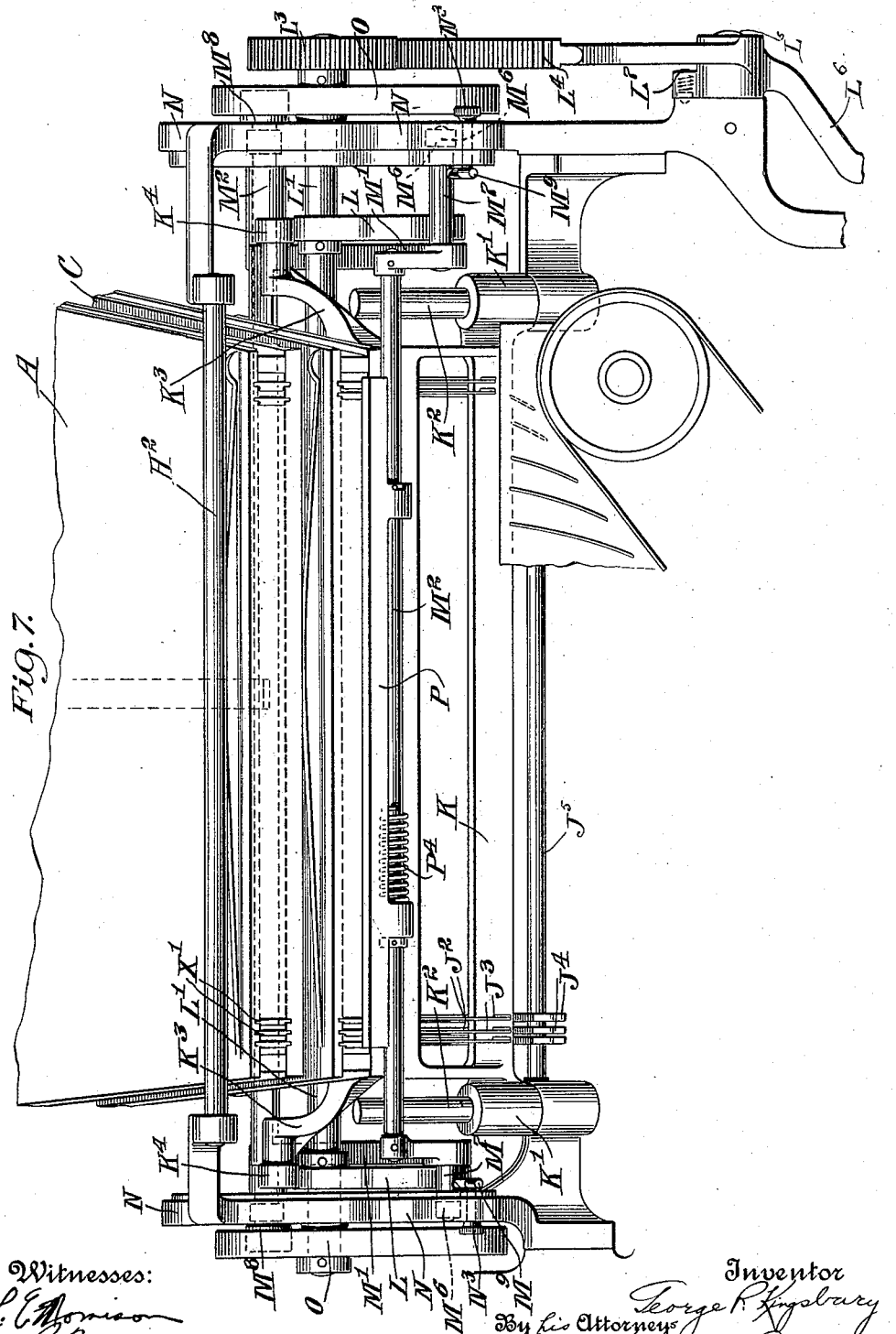

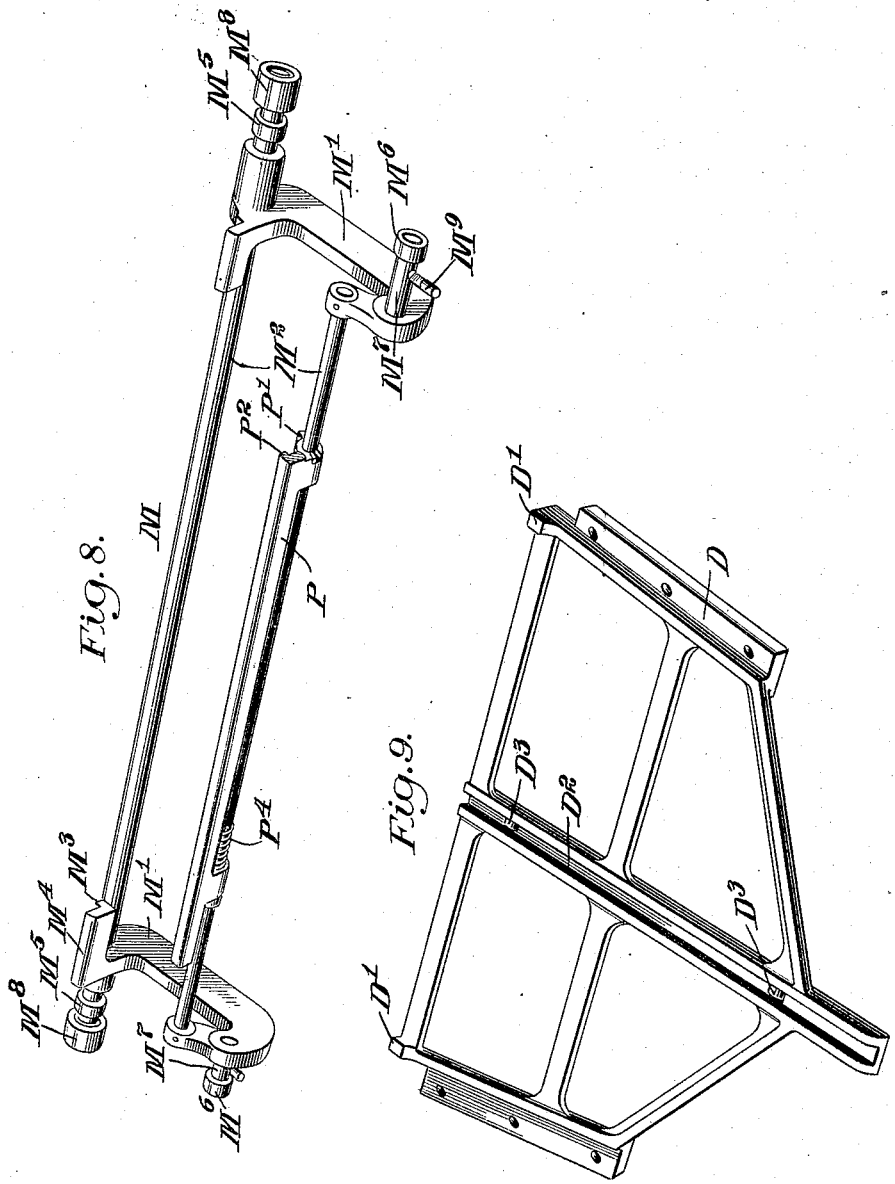

UNITED STATES PATENT OFFICE.

GEORGE P. KINGSBURY, OF BROOKLYN, NEW YORK, ASSIGNOR TO MERGENTHALER LINOTYPE COMPANY, A CORPORATION OF NEW YORK.

TYPOGRAPHICAL MACHINE.

1,197,033.   Specification of Letters Patent.   Patented Sept. 5, 1916.

Application filed September 18, 1915. Serial No. 51,326.

*To all whom it may concern:*

Be it known that I, GEORGE P. KINGSBURY, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines of the general organization represented in Letters Patent of the United States, No. 436532, to O. Mergenthaler, wherein circulating matrices are released from a magazine in the order in which their characters are to appear in print and then assembled in line, the composed line transferred to the face of a mold, the mold filled with molten metal to form a slug or linotype against the matrices which produce the type characters thereon, and the matrices thereafter elevated and returned through a distributing mechanism to the magazine from which they started.

More particularly, it relates to that class of machines equipped with a plurality of magazines, any selected one of which may be brought into action at will.

It is one of the principal objects of my invention to provide a machine of this character, wherein a single bank of escapements may be employed to control the release of the matrices from one or another of the magazines, so as to secure the many advantages arising from such construction. The manner in which this object is attained will be fully explained in the detailed description to follow and finally pointed out in the claims.

In the accompanying drawings, I have shown my invention in preferred form and by way of example, and as applied to a machine of the class stated, but obviously many changes and variations may be made therein, and in its mode of application, which will still be comprised within its spirit. Thus, it may be adapted to other forms of typographical machines, such as type-setters, type-casters and the like, which handle type or dies instead of matrices.

Generally speaking, I desire it to be understood that I do not limit myself to any specific form or embodiment, except in so far as such limitations are specified in the claims.

Figure 1:
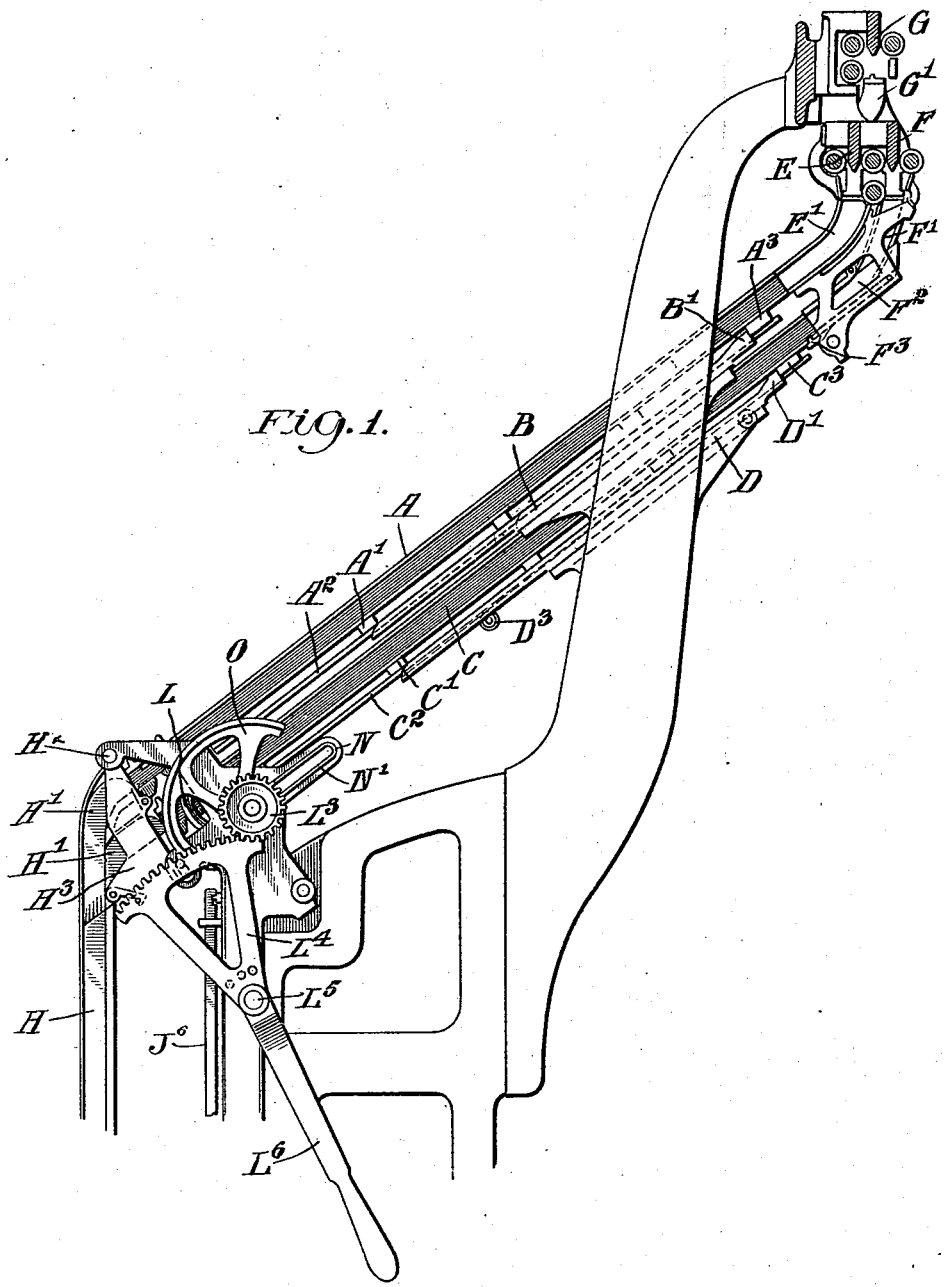
Figure 5:
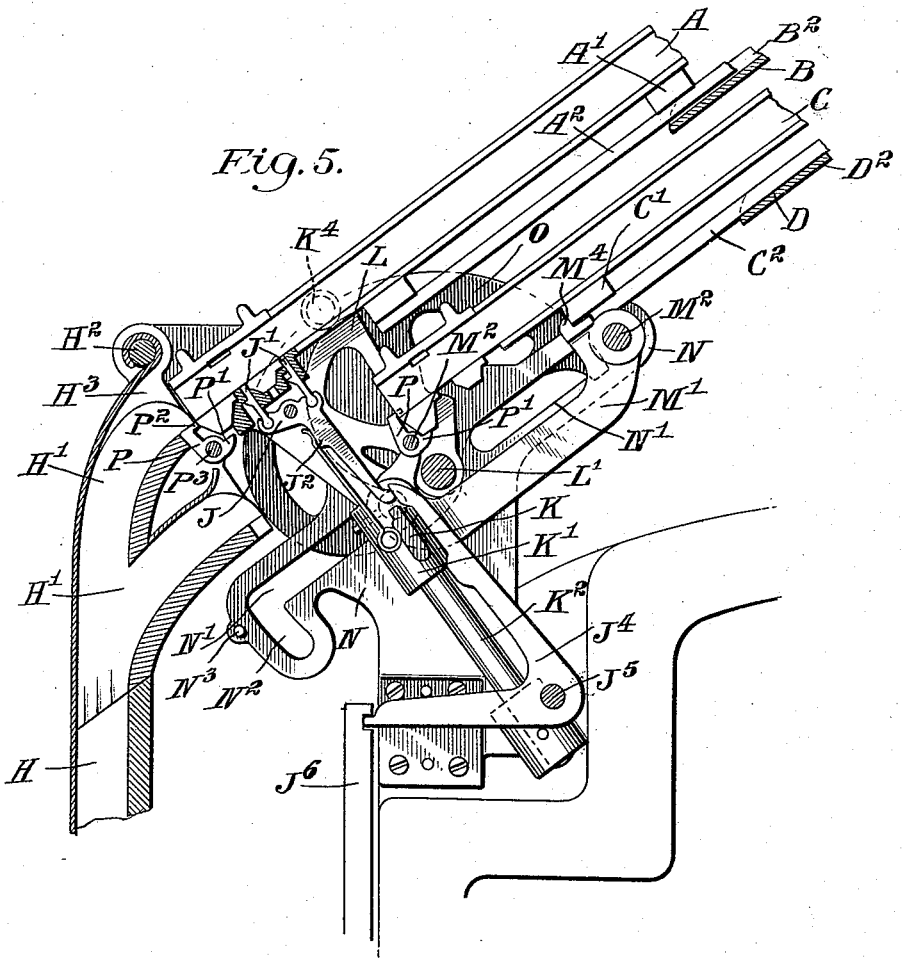
Figure 6:
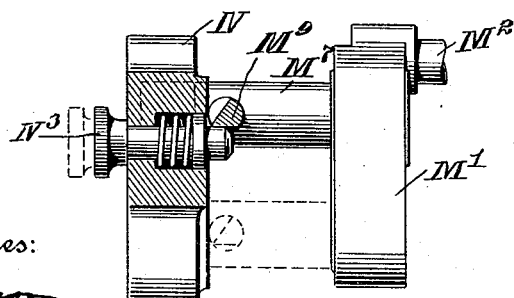

Referring to the drawings: Figure 1 is a side elevation of a portion of a linotype machine having my invention applied thereto; Figs. 2, 3, 4 and 5 are side elevations, partly in section, of the lower portion of the magazines and the coöperating mechanism, showing the parts in different relative positions; Fig. 6 is an enlarged section on the line 6—6 of Fig. 3; Fig. 7 is a front elevation of the parts shown in the preceding figures, with the assembling throats removed; and Figs. 8 and 9 are perspective views of details.

The matrices X are stored according to font in the two magazines A and C, a greater number of which might be employed if desired. They are released from their corresponding magazine by escapement mechanism later to be described, and pass through one or the other of the throats $H^1$ into the vertically channeled raceway H, whence they are carried to the usual assembler and composed in line. The line is then presented to the casting mechanism for the production of the slug, and the matrices are thereafter carried upward and delivered to the separator G, which assorts them according to font and drops them into one or another of the tubes $G^1$ leading to the distributers E and F, which in turn are connected to the magazines A and C by the channel entrance $E^1$ and $F^1$ respectively. The parts so far described, except as hereinafter pointed out, are or may be of any well-known or approved construction, such for instance as illustrated in U. S. Letters Patent to John R. Rogers, No. 848,771.

The magazines A and C are supported in position upon frames B and D attached to the machine frame, the two magazines being provided on their under sides with the usual transverse reinforcing ribs $A^1$ and $C^1$ and the longitudinal ribs $A^2$ and $C^2$, which latter engage in corresponding grooves $B^2$ and $D^2$ of the supporting frames, while the upper cross ribs $A^1$ and $C^1$ have extensions $A^3$ and $C^3$ which engage behind upstanding shoulders $B^1$ and $D^1$ on the supporting frames so as to hold the magazines against forward displacement thereon. The supporting frame D (see Fig. 9) differs from the frame B in the respect that it is provided with rollers D³ upon which the rib C² of the magazine C may slide, the idea being to permit a free and easy movement of the magazine back and forth upon its frame for the purpose later to be described.

Figure 2:
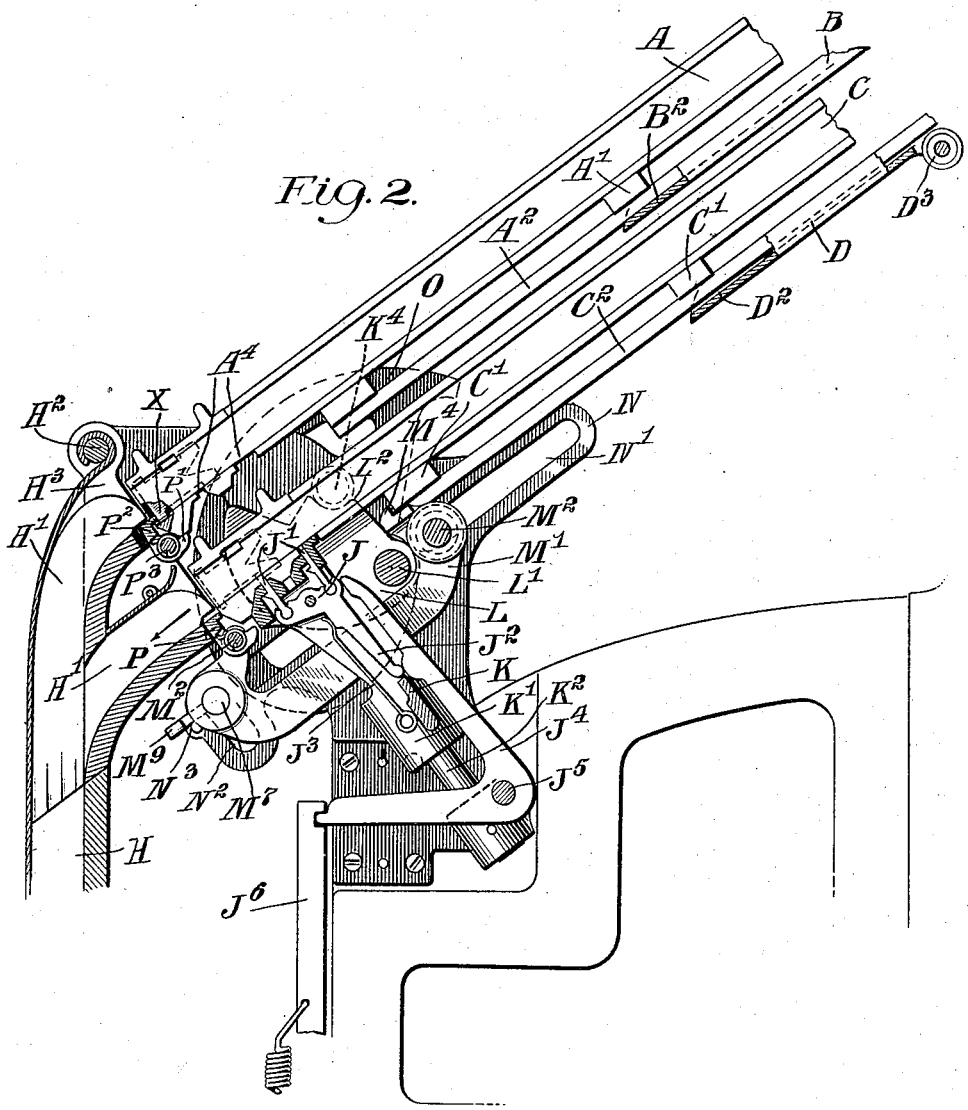

As before mentioned, it is one of the principal objects of the present invention to provide a construction wherein a single series of escapements may be employed to control the release of the matrices from both of the magazines A and C. As shown, each of the escapements consists as usual of a pivoted lever J provided at its opposite ends with pawls J¹ adapted to be projected alternately thereby into the corresponding magazine channel, it being noted that the magazines are provided in their under sides with the openings A⁴ and C⁴ to receive the escapements. The whole series of escapements is mounted in a supporting frame K which is arranged to move vertically to locate them into operative relation to one or the other of the magazines, the frame being provided at its opposite sides (see Fig. 7) with sleeves K¹ slidable up and down upon posts K² projecting from the framework. The movement of the frame is effected by a pair of cams L coöperating with rollers K⁴ journaled to the outer ends of arms K³ projecting laterally from the opposite sides of the frame. When the frame K is in its uppermost position with the escapements in operative relation to the magazine A, the rollers K⁴ rest upon the extreme portions of the cams L, (Fig. 5), and when the frame is in its lower position with the escapements in operative relation to the magazine C, the rollers K⁴ rest in recesses L² formed in the operative edges of the cams (Fig. 2). The cams are fast upon a transverse rock shaft L¹ suitably journaled in the framework and provided at one end with a pinion L³ meshing with a sector L⁴ of a hand lever L⁶ pivoted, as at L⁵, to the framework. The operation of the hand lever L⁶, therefore, raises or lowers the escapements, according to the direction of its movement, to bring them into operative relation to the selected magazine. A spring detent L⁷ (see Fig. 7) coöperating with the hand lever L⁶ holds the parts in their shifted position.

In order that the escapements may be operative in either of their shifted positions, the rocking levers J are provided with downwardly projecting arms J², which are rocked in one direction by springs J³ attached to the frame K and in the opposite direction by angular levers J⁴ pivoted to the machine frame, as at J⁵, and operated by vertically guided rods J⁶ controlled in the usual way from the regular keyboard mechanism, it being noted that the extent of the arms J² is such as to maintain their connection with the levers J⁴ in either position of the frame K.

It will be apparent that before shifting the escapements in the manner above described, it will be necessary to move the lower magazine C out of the way. To effect this result, there is provided a sliding frame or yoke M comprising a pair of side members M¹ connected together by tie-rods M², the frame being supported and guided in the frame work of the machine by two pairs of rollers M⁵ and M⁶, the former journaled on the opposite ends of one of the tie-rods M² and the latter upon short studs M⁷ projecting outwardly from the side members M¹ and engaging in fore and aft slots N¹ of a pair of supporting plates N fixed to the framework at opposite sides. At its rear the frame M is also provided with a supporting bar M³ upon which the lower cross rib C¹ of the magazine C rests, the bar having an upstanding shoulder M⁴ arranged in engagement with the forward edge of the rib. As a result of this construction, when the frame M is shifted backward and forward, it carries the magazine C with it, the magazine, as before described, being slidably mounted upon the supporting frame D. This movement of the shift frame M is effected by means of a pair of cams O fast upon the rock shaft L¹ before referred to, and coöperating with rollers M⁸ journaled to the opposite extremities of the rear tie-rod M², as shown clearly in Fig. 7. The cams O are so proportioned and located with reference to the cams L as to shift the magazine C rearwardly and forwardly before and after the escapements are moved across the longitudinal plane of the magazine.

The operation of the parts will now be clear. When the escapements are in operative relation to the lower magazine C, as shown in Fig. 2, and it is desired to move them vertically into operative relation to the upper magazine A, the shaft L¹ is rotated by the hand lever L⁶ so as to move the cams L to the position shown in Fig. 3, which action lowers the escapement supporting frame K and consequently disengages the escapements from the magazine C, the cams O during this initial rotation of the shaft permitting the frame M to remain in its normal position. The continued rotation of the shaft, however, causes the cams O to shift the magazine C rearwardly to the position shown in Fig. 5, when the escapement supporting frame K is immediately moved across the plane of the lower magazine by the cams L to locate the escapements in operative relation to the upper magazine A, as also indicated in Fig. 5, the cams O having concentric portions which allow them to turn with the cams L in the final rotation of the shaft without affecting the position of the lower magazine C.

Figure 3:
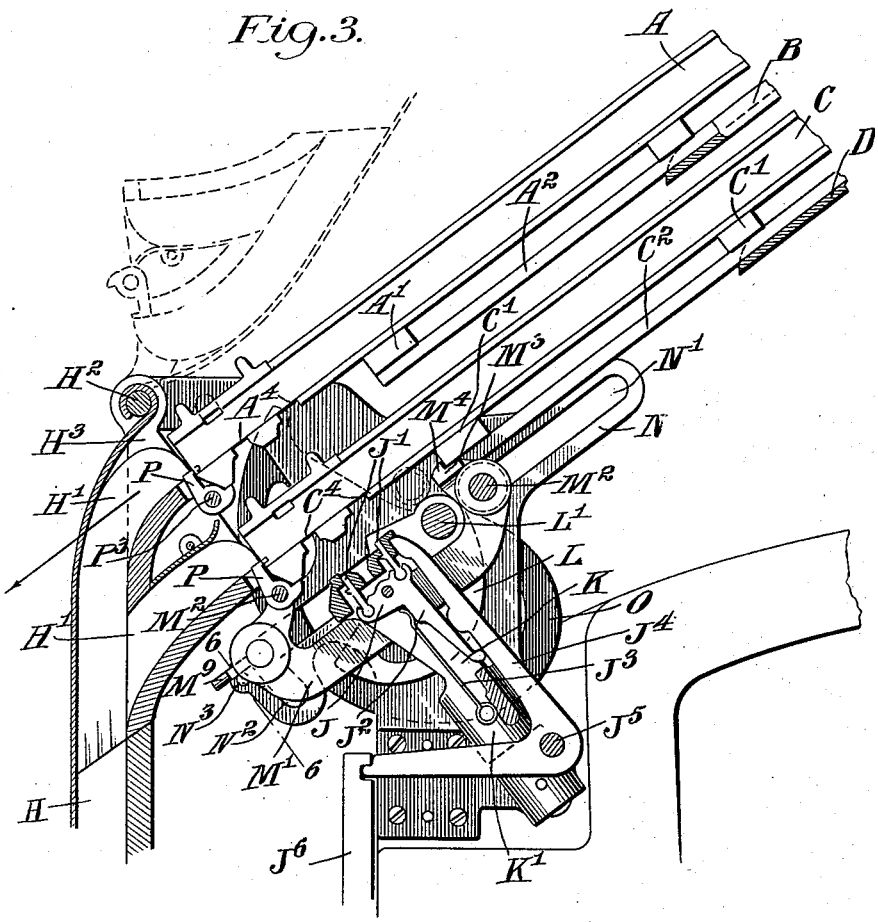

The reverse operation takes place when the escapements are shifted from the upper magazine A back into operative relation to the lower magazine C, that is, the rotation of the shaft L in the opposite direction by the hand lever L⁶ effects first the lowering of the escapements to the position shown in Fig. 3, then the forward movement of the magazine C to locate its opening C⁴ above the escapements, as also shown in Fig. 3, and finally the raising of the escapements into operative relation to the magazine, as indicated in Fig. 2.

Since the escapements are engaged with only one or the other of the magazines at a time, it follows that the matrices would be free to pass from the inactive one unless this were prevented. Each magazine is therefore provided with a locking device to retain the matrices therein, and preferably such devices are controlled automatically in such manner as to be moved to active and inactive position as the escapements are moved out of and into operative relation to the corresponding magazine respectively. In the present instance, each locking device is in the form of an angular bar P having a base flange P¹ and a matrix engaging flange P². The bar for the lower magazine C is pivotally mounted upon the forward tie-rod M² of the sliding frame M, while the one for the upper magazine A is pivotally mounted upon a transverse rod P³ secured in the supporting frame H³ for the throats H¹, each bar being connected to its pivot rod by a torsional spring, as P⁴, which tends constantly to rotate it forwardly out of engagement with the matrices in the magazine. This tendency of the springs, however, is resisted and overcome by the weight of the magazines, which normally rest at their lower ends upon the base flanges P¹ of the bars and hold the flanges P² within the magazine, as illustrated in connection with the upper magazine A in Fig. 2. By lifting the lower ends of the magazines, therefore, the bars will be released and their springs allowed to withdraw the flanges P² therefrom, as shown in connection with the upper magazine in Fig. 5. This lifting of the magazines is effected by the escapement supporting frame K as it raises the escapements into engagement therewith. It follows that when the escapements are lowered away from the magazines, they will reëngage the base flanges P¹ of the bars and move their flanges P² back into place therein, these flanges P² pushing the matrices before them up into the magazines. The bars P thus not only serve to confine the matrices within the magazines when out of use, but also to push the matrices up into them after use, so that when the escapements are engaged or reengaged with the magazines, there will be no danger of the matrices colliding therewith or preventing their proper entrance into the channels thereof. The lifting of the magazines by the escapement supporting frame is further advantageous in that it insures the proper location of the escapements in the openings of the magazines.

Figure 4:
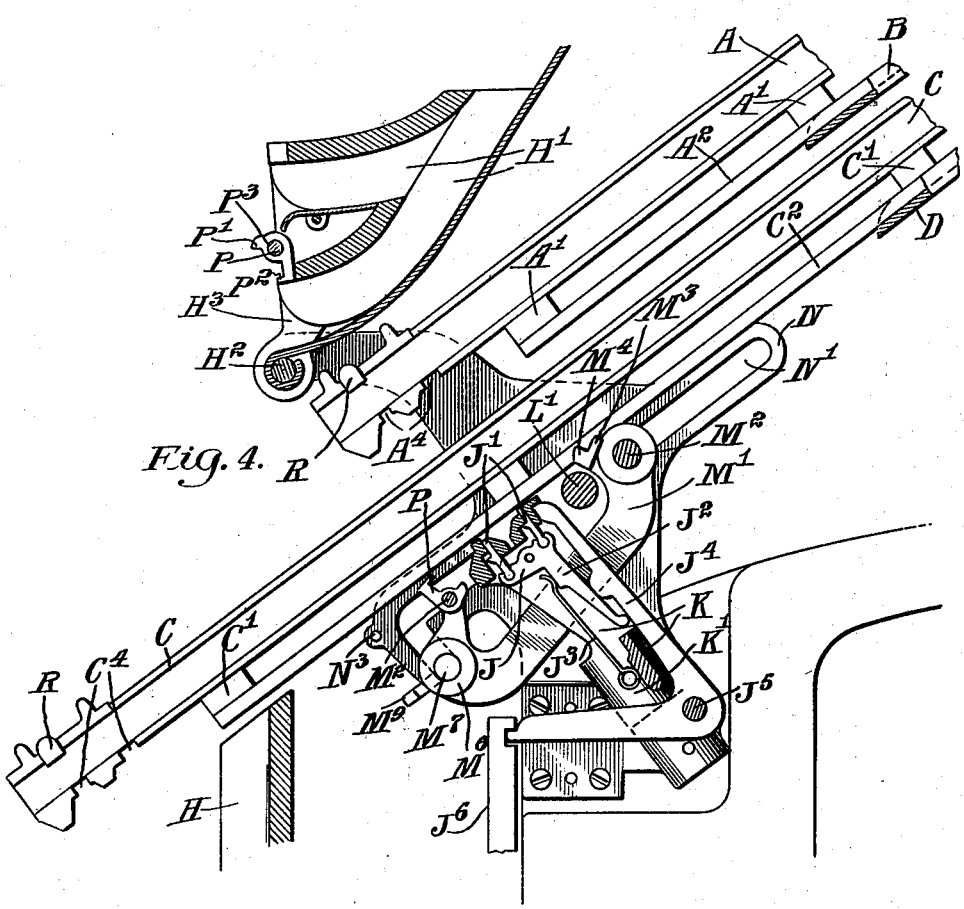

In order to permit the removal of the magazines from the machine, the supporting frame H³ which carries the throats H¹ is pivotally mounted upon the transverse rod H² of the framework so as to be swung upwardly above the magazines, to the position indicated by full lines in Fig. 4 and by dotted lines in Fig. 3. If at this time the escapements are connected to the lower magazine, the upper one may be slid forwardly out of the machine by the mere disengagement of its extensions A³ from the upstanding shoulders B¹ of the supporting frame B. If, however, the escapements are connected to the lower magazine C and it is to be removed, it becomes desirable first to disengage the escapements therefrom and also to lower the sliding frame M to disengage the shoulder M⁴ of its sustaining bar M³ from the forward transverse bar C¹ of the magazine and to remove its other parts from the outgoing path of the magazine.

As already described, the escapements may be lowered away from the magazine to the position shown in Fig. 3 by the operation of the hand lever L⁶; and in order to permit the lowering of the frame M as desired, the supporting plates N are formed at their forward ends with vertical slots N² opening into the fore and aft slots N¹ and adapted to receive the laterally projecting studs M⁷ of the frame. In the normal position of the parts (Fig. 6), the studs are held out of the slots N² by spring-pressed pins N³ mounted in the plates N and arranged beneath lugs M⁹ projecting forwardly from the studs M⁷. The withdrawal of the pins N³, however, removes the support for the studs M⁷, and they are thus allowed to drop into the vertical slots N² enabling the entire frame M to turn downwardly about the rear tie-rod M² as a pivot to the position shown in Fig. 4. In this position of the parts, the magazine C is free to be slid forwardly from the machine, after disengaging its extension C³ from the upstanding shoulders D¹ of its supporting frame. When the substitute magazine has been inserted in place, the frame M is swung upwardly and held in its original position to coöperate therewith, and the escapements also shifted into engagement with the magazine.

Since the matrix retaining bars P are mounted independently of the magazine, it will be necessary to lock the matrices therein before withdrawing them from the machine, and this may be done by the employment of the usual bars R (Fig. 4), which are adapted to be inserted through openings in the edges of the magazines.

In order that the matrices may be distributed into the magazine C in any of its positions or during its movements back and forth in the machine, the channel entrance F¹ is provided with a relatively movable section F² (see Fig. 1) which is attached to the magazine by a latch F³, so as to be movable longitudinally therewith, the section F² being of such length as to maintain its connection with the main section of the entrance in either position of the magazine. This feature in itself is disclosed in the U. S. Letters Patent to P. T. Dodge, No. 1,139,020, to which reference may be had for any further description.

As previously stated, I have shown my invention only in preferred form and by way of example, and it is obvious that many modifications and alterations therein will suggest themselves to those skilled in the art without departure from its scope.

Having thus described my invention, its construction and mode of operation, what I claim and desire to secure by Letters Patent of the United States is as follows:

1. In a typographical machine, the combination of a plurality of magazines, fixed supporting frames upon which they are mounted, and a single series of escapements movable into operative relation to one or another of the magazines, the said magazines being shiftable relatively to each other to permit the movement of the escapements.

2. In a typographical machine, the combination of a plurality of magazines, fixed supporting frames upon which they are mounted, a single series of escapements movable into operative relation to one or another of the magazines, and a plurality of distributers connected to the respective magazines, the said magazines being shiftable relatively to each other to permit the movement of the escapements and without disturbing their connection with the distributers.

3. In a typographical machine, the combination of a plurality of superposed magazines, and a series of escapements arranged behind the forward ends of the magazines and movable transversely thereof so as to be brought into operative relation to one or another, the uppermost magazine being supported in fixed position in the machine frame, and a lower magazine being shiftable forwardly and backwardly in the machine frame to permit the transverse movement of the escapements into operative relation to the fixed magazine.

4. In a typographical machine, the combination of two superposed magazines, the upper one of which is supported in fixed position in the machine frame, and a series of escapements coöperating with the lower magazine and movable at will into operative relation to the upper magazine, the said lower magazine being shiftable rearwardly independently to permit the upward movement of the escapements.

5. In a typographical machine, the combination of a plurality of magazines, a single series of escapements, means for moving the escapements into operative relation to one or another of the magazines, means for shifting the magazines relatively to each other to permit the movement of the escapements, and a common operating device for both said means.

6. In a typographical machine, the combination of a plurality of magazines, a single series of escapements movable into operative relation to one or another of the magazines, the said magazines being shiftable relatively to each other to permit the movement of the escapements, and means for operating the escapements in any of their different positions.

7. In a typographical machine, the combination of a series of escapements movable to different operative positions and each provided with the downwardly extending arms J², and means for operating the escapements, said means including the angular levers J⁴ pivoted in the fixed machine frame and maintaining their connection with the arms J² in any of the different positions of the escapements.

8. In a typographical machine, the combination of a plurality of magazines, a single series of escapements movable into operative relation to one or another of the magazines, the said magazines being shiftable relatively to each other to permit the movement of the escapements, and means for confining the matrices in the inactive magazines.

9. In a typographical machine, the combination of a magazine movably mounted at its lower end, and means actuated by the movement of the magazine for pushing the matrices back within the same.

10. In a typographical machine, the combination of a plurality of magazines, a single series of escapements movable into and out of operative relation to any selected magazine, means for shifting the magazines relatively to each other to permit such movement of the escapements and automatic means for pushing the matrices back within the selected magazine when the escapements are moved out of operative relation thereto.

11. In a typographical machine, the combination of a magazine, and an escapement supporting frame movable into engagement therewith, the said magazine being supported so as to be raised to a slight extent by the supporting frame, for the purpose described.

12. In a typographical machine, the combination of a magazine movably mounted at its lower end, and a matrix retaining bar supported independently of the magazine and controlled in its action by the movement thereof.

13. In a typographical machine, the combination of a magazine, an escapement supporting frame adapted to move the magazine at its lower end, and a matrix retaining bar supported independently of the magazine and controlled in its action by the movement thereof.

14. In a typographical machine, the combination of a magazine and the matrix retaining bar P supported independently thereof and having the base flange $P^1$ upon which the lower end of the magazine is adapted to rest, and also the flange $P^2$ to engage the matrices within the magazine.

15. In a typographical machine, the combination with a magazine and its supporting frame upon which it is directly mounted, of means for shifting the magazine longitudinally with reference to its frame, the said means comprising a frame or yoke engaged with the magazine and slidably mounted in the framework of the machine.

16. In a typographical machine, the combination with a magazine and its supporting frame upon which it is directly mounted, of means for shifting the magazine longitudinally with reference to its frame, the said means comprising a frame or yoke engaged with the magazine and movably mounted in the framework of the machine, a pair of cams coöperating with the yoke, and means for rotating the cams in unison to effect the shifting of the yoke.

17. In a typographical machine, the combination with a magazine and its supporting frame upon which it is directly mounted, of means for shifting the magazine longitudinally with reference to its frame, the said means comprising a frame or yoke engaged with the frame and movably mounted in the framework of the machine, a pair of cams coöperating with the yoke, a rock shaft whereon the cams are mounted, and means for rotating the shaft in opposite directions.

18. In a typographical machine, the combination with a magazine and its supporting frame, of means for shifting the magazine longitudinally with reference to its frame, the said means including a frame or yoke engaged with the magazine and movably mounted in the framework of the machine, and the said yoke being movable at will from its operative position to permit the removal of the magazine.

19. In a typographical machine, the combination of a plurality of magazines, a single series of escapements, the said magazines being shiftable relatively to each other to permit the movement of the escapements into operative relation to one or another of the magazines, a movable supporting frame carrying the escapements, and means for effecting the movement of the supporting frame, the said means including a pair of rotary cams coöperating with the frame, and connections whereby the cams are rotated in unison.

20. In a typographical machine, the combination of a plurality of magazines, a single series of escapements, the said magazines being shiftable relatively to each other to permit the movement of the escapements into operative relation to one or another of the magazines, a movable supporting frame carrying the escapements, and means for effecting the movement of the supporting frame, the said means including a pair of rotary cams coöperating with the frame, a rock shaft whereon the cams are mounted, and means for rotating the shaft in opposite directions.

In testimony whereof, I have affixed my signature in presence of two witnesses.

GEORGE P. KINGSBURY.

Witnesses:
EDWARD GRANT,
CHARLES R. PARSONS.

Copies of this patent may be obtained for five cents each, by addressing the "Commissioner of Patents, Washington, D. C."